United States Patent [19]

Enriquez et al.

[11] Patent Number: 5,649,009

[45] Date of Patent: Jul. 15, 1997

[54] DIFFERENTIAL LONGITUDINAL AMPLIFIER FOR A SUBSCRIBER LINE INTERFACE CIRCUIT

[75] Inventors: Leonel Ernesto Enriquez, Melbourne Beach; Gabriel Julio Uscategui, West Melbourne, both of Fla.

[73] Assignee: Harris Corporation, Melbourne, Fla.

[21] Appl. No.: 340,342

[22] Filed: Nov. 14, 1994

[51] Int. Cl.[6] ............................................. H04M 19/00
[52] U.S. Cl. ........................ 379/399; 379/398; 379/413; 379/414
[58] Field of Search ........................... 379/399, 398, 379/413, 414, 415, 416, 324, 394, 392, 387, 382

[56] References Cited

U.S. PATENT DOCUMENTS

| | | | |
|---|---|---|---|
| 4,357,494 | 11/1982 | Chambers, Jr. ................... | 379/416 |
| 4,476,350 | 10/1984 | Aull et al. ....................... | 379/382 |
| 4,617,426 | 10/1986 | Johansson et al. ............... | 379/324 |
| 4,656,661 | 4/1987 | Carbrey ........................... | 379/399 |
| 4,677,667 | 6/1987 | Burns .............................. | 379/398 |
| 4,782,507 | 11/1988 | Siligoni et al. .................. | 379/399 |
| 4,926,473 | 5/1990 | Bahl et al. ...................... | 379/398 |
| 4,961,219 | 10/1990 | Patel ............................... | 379/398 |
| 5,428,682 | 6/1995 | Apfel .............................. | 379/399 |

Primary Examiner—Krista M. Zele
Assistant Examiner—Scott Wolinsky
Attorney, Agent, or Firm—Rogers & Killeen

[57] ABSTRACT

A circuit and method for sensing and compensating for longitudinal (common mode) signals in a subscriber loop of a telephone system. The circuit and method may include a longitudinal amplifier for sensing a difference between a reference voltage, $V_{BAT}/2$, and a longitudinal voltage in the subscriber loop, and for providing four currents, two to each of two current amplifiers in the telephone system subscriber line interface circuit (SLIC). The longitudinal amplifier includes two current mirrors, each for providing two currents of the same polarity and of the same magnitude. The magnitude of the difference between the two currents being provided to each of the current amplifiers is proportional to the voltage difference. When compensation of the longitudinal signals has been achieved, the two voltages are the same and the magnitudes of the four currents are the same.

20 Claims, 3 Drawing Sheets

DIFFERENTIAL LONGITUDINAL AMPLIFIER FOR A SUBSCRIBER LINE INTERFACE CIRCUIT

BACKGROUND OF THE INVENTION

The present invention is directed to methods and devices for avoiding unwanted longitudinal (common mode) currents in a subscriber loop of a telephone system, and more particularly to a method and device in which a longitudinal amplifier provides currents to current amplifiers that feed tip and ring lines of the subscriber loop to compensate for the longitudinal currents.

With reference to FIG. 1, a typical telephone system 10 includes a subscriber 12 that is a connected to a central station 14 through a subscriber line interface circuit 16 (SLIC) that performs various functions to make the connection. The subscriber 12 is connected to the SLIC 16 with a bidirectional balanced two wire connection, that is denoted as subscriber loop 18. The subscriber loop 18 is connected to the SLIC 16 at tip and ring terminals 20 that feed current amplifiers 22 that receive speech signals from a receiver 24 in the SLIC 16. The SLIC 16 connects the subscriber loop to the central station 14 through an unbalanced four wire connection 26.

Speech signals are transmitted through the telephone system as metallic (or normal mode) currents. However, unwanted interference, such as crosstalk from other telephone signals or noise related to power induction, may also be present in the subscriber loop. The present invention is directed to the removal of this interference that appears in the subscriber loop as a longitudinal (or common mode) current.

Various techniques for compensating for the longitudinal current have been attempted. For example, a common mode current feedback circuit may provide two compensating currents, one for each of the current amplifiers 22, to compensate for the longitudinal current. However, each of the compensating currents is provided to the current amplifiers through a single resistor. Since the difference between the input currents to the current amplifiers is not zero, a built in temperature sensitivity for the output currents results. Further, the noise introduced and power consumed by the known corrective techniques are higher than desired. See, U.S. Pat. No. 4,476,350 issued Oct. 9, 1984 to Aull, et at.

Accordingly, it is an object of the present invention to provide a novel device and method for compensating for longitudinal currents in the subscriber loop that obviates the problems of the prior art.

It is another object of the present invention to provide a novel device and method for compensating for longitudinal currents in the subscriber loop in which two pairs of matched currents are applied to two pairs of matched resistors at the current amplifiers to improve operating precision.

It is still another object of the present invention to provide a novel device and method for compensating for longitudinal currents in the subscriber loop in which the gain of the current amplifiers is reduced by one half, the gain of the longitudinal amplifier is increased from one to two, and the gain of the receiver is increased from one to two to reduce system noise in the SLIC.

It is a further object of the present invention to provide a novel device and method for compensating for longitudinal currents in the subscriber loop in which a differential current approach is used to increase power savings per chip area.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
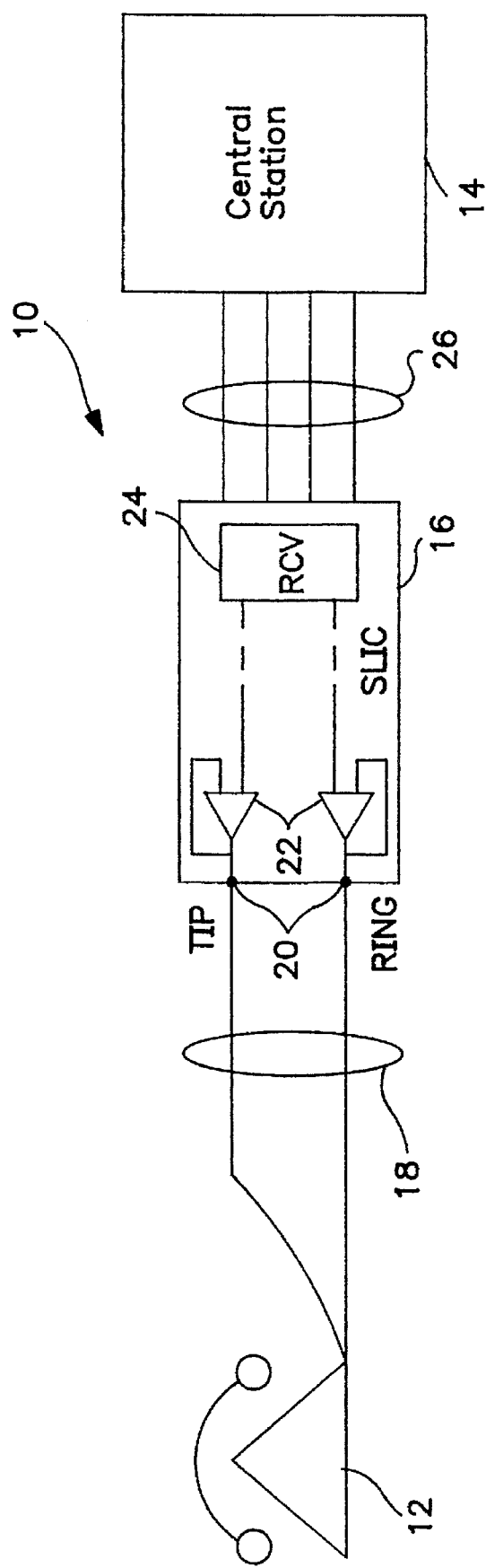
FIG. 1 is a schematic of a typical telephone system in which the present invention may find application.
Figure 2:
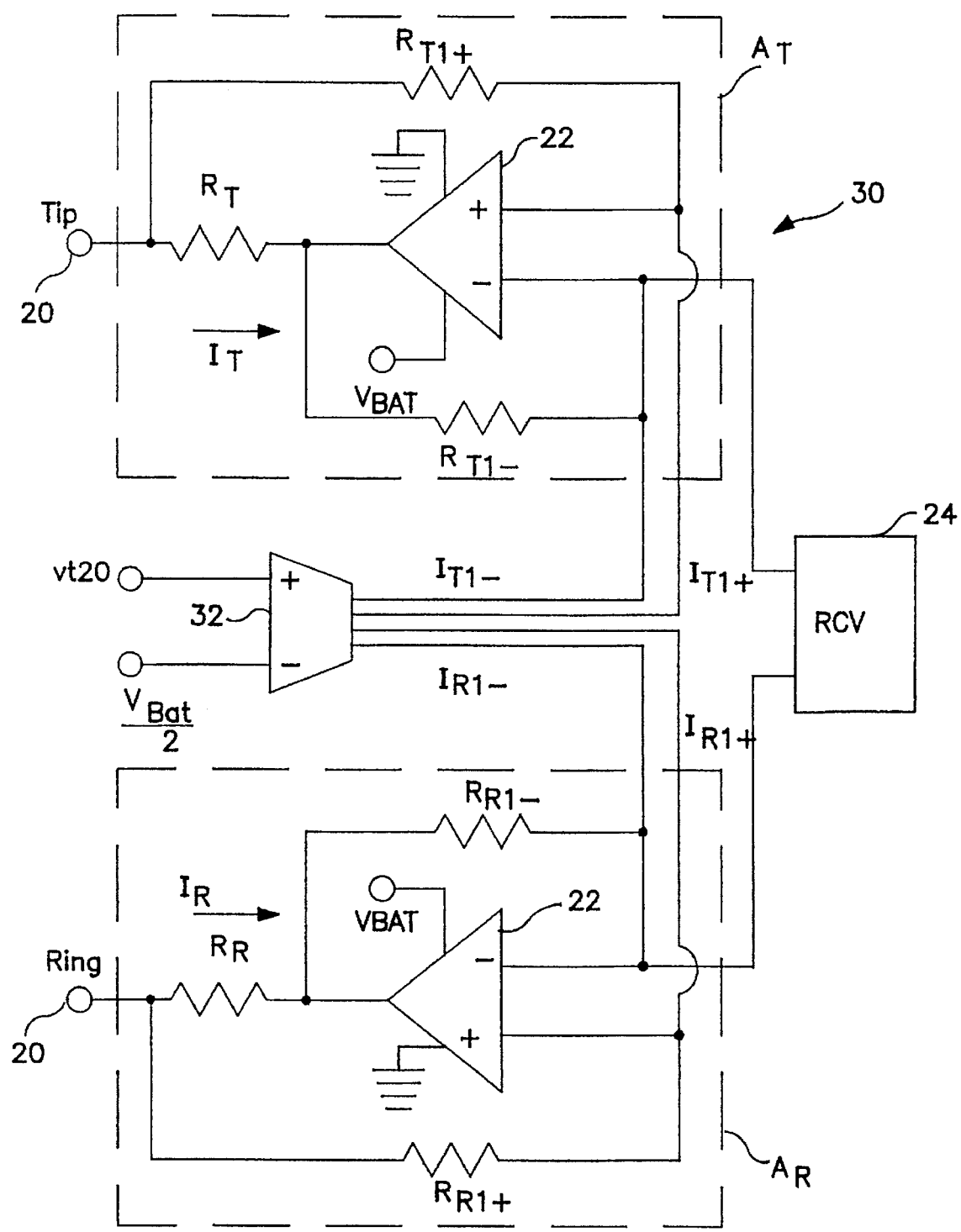
FIG. 2 is a circuit diagram of an embodiment of the present invention.

With reference now to FIG. 2, an embodiment 30 of the present invention may include a differential longitudinal amplifier 32 that compares a longitudinal voltage vt20 in the subscriber loop 18 to a reference voltage that in this embodiment is one half the battery voltage $V_{BAT}/2$. The longitudinal voltage vt20 is the average voltage that appears at the tip and ring terminals 20 relative to ground and may be determined conventionally.

As a result of the comparison, the longitudinal amplifier 32 provides four output currents, $I_{T1}-$, $I_{T1}+$, $I_{R1}-$, $I_{R1}+$ to tip and ring amplifiers $A_T$ and $A_R$. When the two voltages are the same, the four currents have equal magnitudes and the polarities indicated, and when the two voltages are different the current differences between $I_{T1}-$ and $I_{T1}+$ and between $I_{R1}-$ and $I_{R1}+$ are proportional to the voltage difference.

The four currents are applied respectively across four resistors $R_{T1}-$, $R_{T1}+$, $R_{R1}-$, $R_{R1}+$ so that the relationship of currents $I_R$ and $I_T$ flowing through resistors $R_R$ and $R_T$ and in the subscriber loop may be expressed:

$$I_R R_R = (I_{R1}+ - I_{R1}-)(R_{R1}+ + R_{R1}-)$$

$$I_T R_T = (I_{T1}+ - I_{T1}-)(R_{T1}+ + R_{T1}-)$$

The currents $I_R$ and $I_T$ compensate for the longitudinal currents in the subscriber loop sensed by the differential amplifier 32. When the compensation is correct, the four currents have equal magnitudes, and the device feeds back the four currents in a effort to achieve the correct compensation.

By way of further explanation, the longitudinal amplifier is, in effect, synthesizing an average longitudinal resistance:

$$R_{LONG} = vt20/I_{LONG} = 1/[gm(K+1)],$$

where gm is the transconductance of the longitudinal amplifier 32, and K is the current gain of amplifiers $A_T$ and $A_R$, that is:

$$K = R_{T1}-/R_T = R_{T1}+/R_T = R_{R1}-/R_R = R_{R1}+/R_R$$

Figure 3:
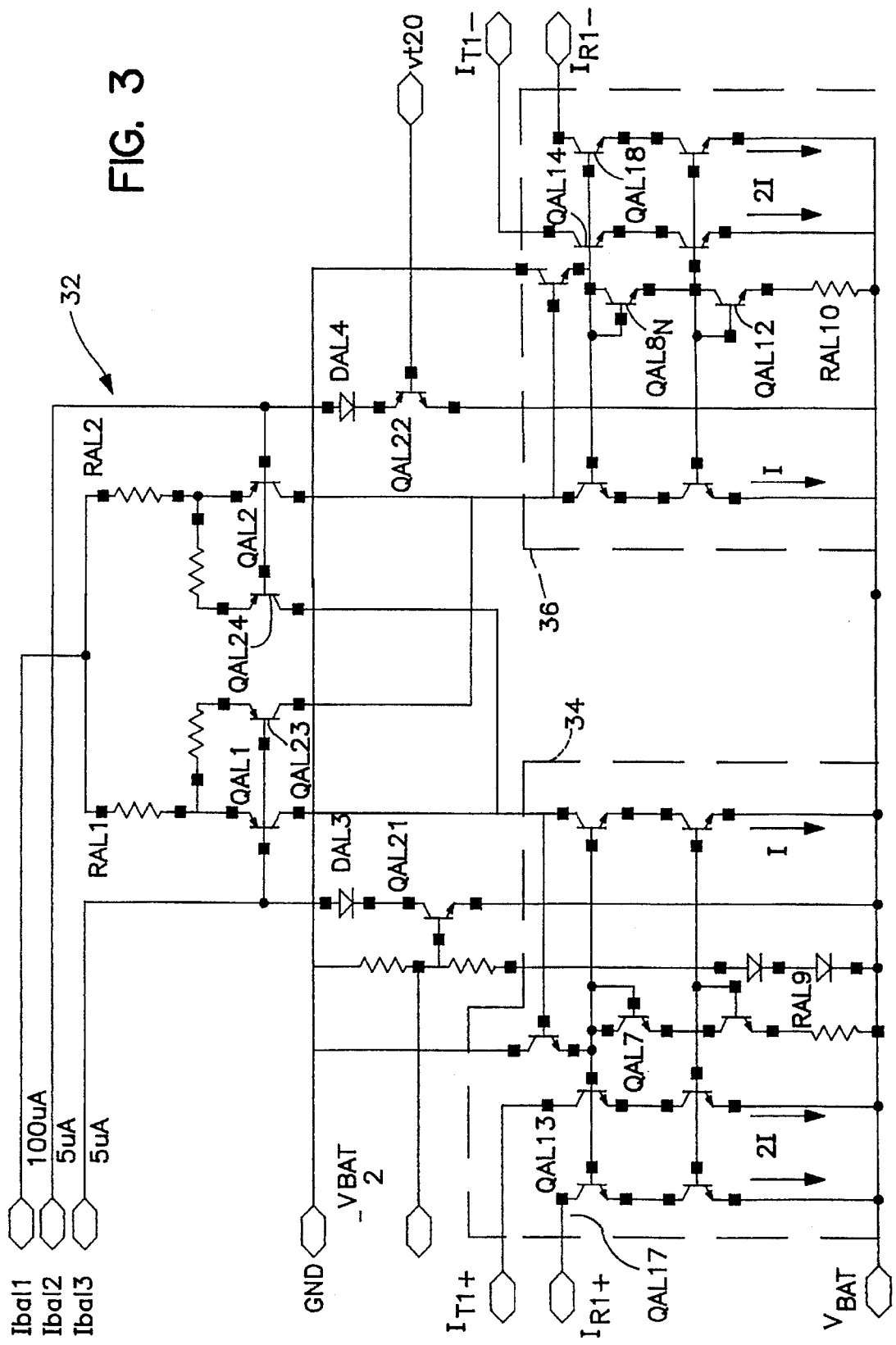
FIG. 3 is a circuit diagram of an embodiment of the longitudinal amplifier of the present invention.

With reference now to FIG. 3, an embodiment of the longitudinal amplifier 32 may include a pair of transistors QAL1 and QAL2 for sensing the voltage difference between $V_{BAT/2}$ and vt20 and for providing inputs to current mirrors 34 and 36. Inputs Ibal1, Ibal2 and Ibal3 provide operating currents, with Ibal1 providing an operating current to the differential amplifier consisting of QAL1 and QAL2, and with Ibal2 and Ibal3 providing operating currents to the emitter followers QAL21 and QAL22. Differential amplifier QAL1 and QAL2 senses the voltage difference between $V_{BAT}/2$ and vt20. When $V_{BAT}/2$ and vt20 are equal, the four currents $I_{T1}-$, $I_{T1}+$, $I_{R1}-$, $I_{R1}+$ are also equal. When $V_{BAT}/2$ and vt20 are not equal the currents $I_{T1}+$ and $I_{R1}+$ differ from currents $I_{T1}-$ and $I_{R1}-$ by a value proportional to that voltage difference.

System power consumption and noise may be reduced by using the differential approach disclosed herein and by adjusting the gain of the current amplifiers, current mirrors in the longitudinal amplifier, and the SLIC receiver. In the prior art that used a single ended approach, the noise sources appeared at the positive terminal of the current amplifiers 22 and were thus magnified. In the present invention, there are two correlated sources of noise, one at each of the inputs of the current amplifiers, that are cancelled through the common mode rejection characteristic of the amplifiers. Noise may be further reduced by decreasing the gain of the current amplifiers 22 (such as by a factor of two), increasing the gains of the current mirrors 34 and 36 (such as a factor of two), and increasing the gain of the receiver 24 (such as by a factor of two).

In the operation of the circuit of FIG. 3, input impedance may be boosted and the circuit protected from high voltage transients through the operation of the Darlington front end arrangement of QAL21, QAL22 and high voltage blocking diodes DAL3 and DAL4. A pair of cross coupled transistors QAL23 and QAL24 bias the current mirrors regardless of the differential voltage applied, thereby ensuring well behaved transient and frequency responses with widely varying longitudinal voltages. The circuit provides a flat frequency response through about 100 KHz.

Transistors QAL3 and QAL4 provide base current error compensation and are biased by transistors QAL7, QAL11, QAL8, and QAL12 and by resistors RAL9 and RAL10 using a very small current (e.g., five microamps). High output impedance in the collectors of QAL13, QAL14, QAL17, and QAL18 is achieved by applying the known technique of Early Voltage neutralization.

The longitudinal amplifier of FIG. 3 has a transconductance gm of:

$$gm=2/(RAL1+re_{QAL1})$$

where $re_{QAL1}$ is the dynamic resistance of QAL1, where RAL1 is the resistance of resister RAL1, and where the factor 2 in the numerator reflects the current gains of the current mirrors 34 and 36 in the embodiment of FIG. 3.

As will be appreciated by those of skill in the art, the device herein provides lower power consumption per unit chip area than prior art resistor implementations. For example, implementation of a resistive feedback technique (such as disclosed in Aull, et al. discussed above) with power comparable to that of the circuit of FIG. 3 would require feedback resistors of more than two megohms that would use considerably more chip area than disclosed herein. The circuit of FIG. 3 may operate within 1.5 volts of $V_{BAT}$ while maintaining linearity and an output resistance greater than ten megohms. The transistors of FIG. 3 are shown in their preferred type (e.g., PNP, NPN), although the opposite type may be used as well.

Desirably the longitudinal amplifier 32 and the resistors $R_{T1}-$, $R_{T1}+$, $R_{R1}-$, $R_{R1}+$ are integrated in the same chip.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A circuit for sensing and compensating for longitudinal currents in a subscriber loop of a telephone system, wherein a tip terminal of the subscriber loop is connected to a first current amplifier and a ring terminal of the subscriber loop is connected to a second current amplifier, the circuit comprising:

a longitudinal amplifier for sensing a voltage difference between a reference voltage, $V_{BAT}/2$, and a longitudinal voltage, vt20, in the subscriber loop, and for providing two current differences of opposite polarity to each of the first and second current amplifiers, the magnitudes of said current differences being provided to each of the first and second current amplifiers being substantially equal and proportional to said voltage difference.

2. The circuit of claim 1 wherein said longitudinal amplifier comprises a pair of current mirrors, each for providing two currents of the same magnitude.

3. The circuit of claim 2 wherein said current mirrors have current gains greater than one.

4. The circuit of claim 2 wherein said longitudinal amplifier further comprises a first pair of transistors with common emitters for receiving a common operating current, and with collectors that provide inputs to said current mirrors, the inputs being related to said voltage difference.

5. The circuit of claim 4 wherein said longitudinal amplifier further comprises a second pair of transistors for boosting an input impedance of said circuit, wherein emitters of said second pair of transistors are connected to high voltage blocking diodes.

6. The circuit of claim 5 wherein said longitudinal amplifier further comprises a third pair of transistors with emitters and bases common with emitters and bases of said first pair of transistors for biasing said current mirrors.

7. The circuit of claim 6 wherein said first, second and third pairs of transistors are pairs of PNP transistors.

8. The circuit of claim 1 wherein said current differences provided by said longitudinal amplifier have substantially the same magnitude when the reference voltage, $V_{BAT}/2$, is the same as the longitudinal voltage, vt20, in the subscriber loop.

9. A subscriber line interface circuit (SLIC) comprising:

a first current amplifier connected to a tip terminal of the SLIC for amplifying a normal mode signal conveyed between a subscriber and a telephone central station;

a second current amplifier connected to a ring terminal of the SLIC for amplifying the normal mode signal; and a longitudinal amplifier for sensing a voltage difference between a reference voltage and a longitudinal voltage in a subscriber loop, and for providing four compensation currents, two of said four compensation currents being provided to each of said current amplifiers, so that the magnitude of the difference between said two of four compensation currents is proportional to said voltage difference.

10. The SLIC of claim 9 further comprising a receiver for receiving the normal mode signal from the telephone central station, and wherein said longitudinal amplifier and said receiver have current gains greater than one.

11. The SLIC of claim 9 further comprising a pair of resistors for each of said current amplifiers, each said pair for receiving said two of four compensation currents.

12. The SLIC of claim 11 wherein each said pair of resistors is matched and colocated in an integrated circuit.

13. The SLIC of claim 9 wherein said longitudinal amplifier comprises a pair of current mirrors, each for providing two of said four compensation currents.

14. The SLIC of claim 13 wherein said current mirrors have current gains greater than one, and said current amplifiers have a proportionally reduced gain.

15. A method of compensating for longitudinal currents in a subscriber loop of a telephone system comprising the steps of:

(a) sensing with a longitudinal differential amplifier a difference between a battery related reference voltage and a longitudinal voltage in a subscriber loop;

(b) providing from the longitudinal differential amplifier four compensating currents, two of the compensating currents being provided to each of two current amplifiers that feed the subscriber loop; and (c) directing the two compensating currents through a pair of resistors connected to each of the corresponding current amplifiers.

16. The method of claim 15 further comprising the steps of:

(d) increasing gain of the compensating currents in the longitudinal differential amplifier by a factor of more than one; and (e) decreasing gain of the current amplifiers proportionally.

17. The method of claim 15 further comprising the step of matching the resistances in each pair of resistors.

18. The method of claim 15 further comprising the step of providing the longitudinal amplifier with a pair of current mirrors, each for providing two of the compensating currents which are of the same magnitude.

19. The method of claim 18 further comprising the step of providing the longitudinal amplifier with a pair of transistors for biasing the current mirrors.

20. The method of claim 15 further comprising the step of providing the longitudinal amplifier with a pair of transistors and serially connected blocking diodes for boosting an input impedance of longitudinal amplifier.

* * * * *